(12) United States Patent
Hsia

(10) Patent No.: US 9,743,484 B2
(45) Date of Patent: Aug. 22, 2017

(54) LINEAR SOLID-STATE LIGHTING WITH ELECTRIC SHOCK AND ARC PREVENTION MECHANISMS FREE OF FIRE AND SHOCK HAZARDS

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 15/225,748

(22) Filed: Aug. 1, 2016

(65) Prior Publication Data

US 2016/0345403 A1 Nov. 24, 2016

Related U.S. Application Data

(63) Continuation-in-part of application No. 14/818,041, filed on Aug. 4, 2015, now Pat. No. 9,420,663, which
(Continued)

(51) Int. Cl.
| | |
|---|---|
| H05B 33/08 | (2006.01) |
| F21V 23/02 | (2006.01) |
| F21V 25/12 | (2006.01) |
| F21V 25/04 | (2006.01) |
| H02M 1/32 | (2007.01) |
| F21K 9/27 | (2016.01) |

(Continued)

(52) U.S. Cl.
CPC ........... *H05B 33/0887* (2013.01); *F21K 9/27* (2016.08); *F21V 25/04* (2013.01); *F21V 25/12* (2013.01); *H02M 1/32* (2013.01); *H05B 33/0803* (2013.01); *H05B 33/0806* (2013.01); *H05B 33/0815* (2013.01); *H05B 33/0845* (2013.01); *H05B 33/0884* (2013.01); *F21K 9/278* (2016.08); *F21Y 2115/10* (2016.08); *H02M 2001/0058* (2013.01); *Y02B 20/341* (2013.01); *Y02B 20/346* (2013.01); *Y02B 70/1491* (2013.01)

(58) Field of Classification Search
None
See application file for complete search history.

(56) References Cited

U.S. PATENT DOCUMENTS 9,480,123 B2 * 10/2016 Van Dijk ............ H05B 33/0884
2012/0181952 A1 * 7/2012 Roeer ................ H05B 33/0809
315/307

(Continued)

*Primary Examiner* — Douglas W Owens
*Assistant Examiner* — James H Cho
(74) *Attorney, Agent, or Firm* — Han IP Corporation; Andy M. Han

(57) ABSTRACT

A linear light-emitting diode (LED)-based solid-state lamp comprising electric shock and arc prevention switches, thermal protection devices, and bi-pins at the opposite ends normally operates with either an electronic ballast or AC mains. When such a lamp is installed in or uninstalled from a lamp fixture with the bi-pins in lamp sockets, the electric shock and arc prevention switches with double controls can work with the electronic ballast to prevent an electric arc from occurring not only between the lamp sockets and the bi-pins but also between electrical contacts in the electric shock and arc prevention switches. Together with the thermal protection devices, the lamp eliminates any possible fire hazard associated with the electric arc while maintaining electric shock free for installers.

26 Claims, 4 Drawing Sheets

Related U.S. Application Data is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(51) Int. Cl.
*F21K 9/278* (2016.01)
*F21Y 115/10* (2016.01)
*H02M 1/00* (2006.01)

(56) References Cited

U.S. PATENT DOCUMENTS

2013/0128574 A1* 5/2013 Ivey .................. F21V 23/06
362/235
2017/0138580 A1* 5/2017 Wen .................. F21V 25/10

\* cited by examiner

LINEAR SOLID-STATE LIGHTING WITH ELECTRIC SHOCK AND ARC PREVENTION MECHANISMS FREE OF FIRE AND SHOCK HAZARDS

CROSS-REFERENCE TO RELATED APPLICATIONS

This application is a continuation-in-part (CIP) application of U.S. patent application Ser. No. 14/818,041, filed Aug. 4, 2015 and currently pending, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. The above-identified applications are incorporated herein by reference in their entirety.

BACKGROUND

Technical Field

The present disclosure relates to linear light-emitting diode (LED) lamps that operate with linear tube lamp fixtures configured to electrically connect to either an electronic ballast or AC mains, and more particularly to a universal, shock and fire hazard-free linear LED tube lamp with electric shock and arc prevention mechanisms.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit application of a linear LED tube (LLT) lamp to replace an existing fluorescent tube, consumers may choose either to adopt a ballast-compatible LLT lamp with an existing ballast used to operate the fluorescent tube or to employ an AC mains-operable LED lamp by removing/bypassing the ballast. Either application has its advantages and disadvantages. In the former case, although the ballast consumes extra power, it is straightforward to replace the fluorescent tube without rewiring, which consumers may have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumers will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and long-term maintenance costs will be unacceptable to end users. From energy saving point of view, a ballast constantly draws power, even when the ballast-compatible LLT lamps are dead or not installed. In this sense, any energy saved while using the ballast-compatible LLT lamps becomes meaningless with the constant energy use by the ballast. In the long run, ballast-compatible LLT lamps are more expensive and less efficient than self-sustaining AC mains-operable LLT lamps.

On the contrary, an AC mains-operable LLT lamp does not require a ballast to operate. Before use of an AC mains-operable LLT lamp, the ballast in a fixture must be removed or bypassed. Removing or bypassing the ballast does not require an electrician and can be replaced by end users. Each AC mains-operable LLT lamp is self-sustaining. If one AC mains-operable tube lamp in a fixture goes out, other lamps in the fixture are not affected. Once installed, the AC mains-operable LLT lamps will only need to be replaced after 50,000 hours. In view of above advantages and disadvantages of both ballast-compatible LLT lamps and AC mains-operable LLT lamps, it seems that market needs a most cost-effective solution by using a universal LLT lamp that can be used with the AC mains and is compatible with an electronic ballast so that LLT lamp users can save an initial cost by changeover to such a universal LLT lamp followed by retrofitting the lamp fixture to be used with the AC mains when the ballast dies.

Electronic ballasts have several different types. However in the US, instant-start electronic ballasts are most popular in lamp fixtures because they are more efficient and less expensive than other types of electronic ballasts and have fewer wires for installation. Nevertheless, it is better for the ballast-compatible LLT lamp to be compatible with either instant-start or rapid-start electronic ballasts. In the context hereafter, the instant-start electronic ballast will be referred to when a ballast is mentioned unless a rapid-start electronic ballast is explicitly stated.

In the U.S. patent application Ser. No. 14/688,841, filed Apr. 16, 2015, two shock prevention switches and an all-in-one driving circuit are adopted in an LLT lamp such that AC power from either an electronic ballast or the AC mains can operate the lamp without operational uncertainty and electric shock hazards. In other words, no matter what a lamp fixture is configured as the AC mains or an electronic ballast compatible fashion, the LLT lamp automatically detects configurations and works for either one. All of such LLT lamps, no matter whether AC mains-operable or ballast compatible, are electrically wired as double-ended and have one construction issue related to product safety and needed to be resolved prior to wide field deployment. This kind of LLT lamps always fails a safety test, which measures through lamp leakage current. Because an AC-mains voltage applies to both opposite ends of the tube when connected to a power source, the measurement of current leakage from one end to the other consistently results in a substantial current flow, which may present a risk of an electric shock during re-lamping. Due to this potential shock risk to the person who replaces the LLT lamps in an existing fluorescent tube fixture, Underwriters Laboratories (UL) uses its standard, UL 935, Risk of Shock During Relamping (Through Lamp), to do a current leakage test and to determine if the LLT lamps meet the consumer safety requirement. Although the LLT lamps used with an electronic ballast can pass the current leakage test, some kinds of electric shock hazards do exist. Experimental results show that the skin of the person who touches an exposed bi-pin may be burned due to such an electric shock. Fortunately, a mechanism of double shock prevention switches used in applications with the AC mains is also effective in applications with the ballasts to prevent the electric shock from occurring, thus protecting consumers from such a hazard, no matter whether input voltage is from the AC mains or the electronic ballast. Therefore, a universal LLT lamp that can work with either the AC mains or the electronic ballast makes sense. The effectiveness of using double shock prevention switches for applications in the AC mains has been well addressed in U.S. Pat. No. 8,147,091, issued on Apr. 3, 2012. However, a conventional shock prevention switch has an inherent issue related to an electric arc when operated with an electronic ballast. Unlike an AC voltage of 120 or 277 V/50-60 Hz from the AC mains, the output AC voltage and current from the electronic ballast presents a negative resistance characteristic. The feature that originally supports a fluorescent tube to function properly becomes extremely detrimental to the conventional shock prevention switch due to the electric arc likely occurring between two electrical contacts that have a high electrical potential difference with a high frequency, such as 600 V/50 kHz. Once a consumer fails to follow installation instructions to install or uninstall linear LED tube lamps such that one of two ends of the tube lamp is in the fixture socket connected to a powered electronic ballast, and the other end is tweaked to connect to or disconnect from the associated socket, an internal arcing may occur between the electrical contacts in the associated switch. The arcing even in a short period such as several seconds can generate high heat, burning and melting electrical contacts and neighboring plastic enclosures, creating a fire hazard. The AC voltage of 120 or 277 V/50-60 Hz from the AC mains does not have such an issue because its voltage is relatively low compared with the ballast output voltage of 600 V. Moreover, the AC frequency of 60 Hz automatically extinguishes an arc every 1/60 seconds, if existed. That is why a utility switch can be used in an electrical appliance to turn power on and off without any problem. However when used with the electronic ballast, the electrical contacts used in the conventional shock prevention switch can easily be burned out due to the high-voltage and high-frequency arcing introduced between each gap of each pair of the electrical contacts in the conventional shock prevention switch when someone tries to abusively tweak to remove the tube lamp from the fixture with the ballast that has a power on it. Although such a situation is rare, an internal arcing, if occurred, does cause burning and even welding of the electrical contacts and melting of the plastic enclosure, so called internal fire, creating consumer safety issues.

Furthermore, when the LLT lamp is installed in an old fluorescent tube fixture, the two bi-pins at the two opposite ends of the LLT lamp are mounted on the two sockets on the fluorescent tube fixture, assuming that good electrical connections are made. When copper contacts of the sockets on the old fluorescent tube fixture become worn out over time, the electrical connections between the bi-pins and the socket copper contacts may be poor. When an installation is made as the worn socket copper contacts are energized, an electric arc will unavoidably occur between the bi-pins and the socket copper contacts. Like the internal arcing between the electrical contacts in the shock prevention switch, the electric arc between the bi-pins and the socket copper contacts, even a short period of time such as a few seconds, may generate high heat conducting through the bi-pins to burn and melt the plastics used to fix the bi-pins on the end caps of the LLT lamps, creating a fire hazard. It is therefore the purpose of the present disclosure to disclose an electric arc prevention mechanism by using electric shock prevention switches with double controls and thermal protection mechanism to eliminate the fire hazard in the LLT lamp operating with the electronic ballast or the AC mains.

SUMMARY

A universal linear LED tube (LLT) lamp comprising a housing having two ends; an LED printed circuit board (PCB) with a plurality of LEDs connected as LED arrays; a lens; an LED driving circuit; and two input modules associated with the two ends, each comprising a shock prevention switch and at least one thermal protection device, is used to replace a fluorescent tube in a retrofit or newly-made linear tube lamp fixture that could have an existing electronic ballast or simply an AC mains-ready configuration. When such a universal LLT lamp is installed in or uninstalled from the energized lamp fixture, the shock prevention switches and the at least one thermal protection device can prevent fire and electric shock from occurring, eliminating possible internal fire hazard while maintaining electric shock free for consumers.

In one embodiment, the shock prevention switch of each of the lamp bases comprises at least one set of electrical contacts and a switch actuation mechanism. The at least one set of electrical contacts comprises at least two electrical contacts, with one electrically connected to the at least one thermal protection device and another coupled to the LED driving circuit. The switch actuation mechanism comprises at least one front control portion protruding outwards. When the at least one front control portion of the switch actuation mechanism is pressed in or twisted on as the bi-pin of the lamp base is installed in a lamp socket, the at least two electrical contacts of the at least one set of electrical contacts are electrically connected to actuate the shock prevention switch. If an electric arc occurs, no matter whether it does externally between the bi-pins and the sockets, or internally between the at least two electrical contacts in the at least one set of electrical contacts, the at least one thermal protection device can shut off a current flow immediately before the high heat generated by the electric arc further damages the plastic enclosure, creating a fire.

In another embodiment, the shock prevention switch comprises two controls, one associated with the at least one front control portion of the switch actuation mechanism and the other involved with a manual control. Only after both controls are executed, can the shock prevention switch be actuated to turn on the electrical connection between the at least two electrical contacts in the shock prevention switch. Without a current flow, an electric arc will never occur. The use of the double controls in the shock prevention switch ensures that the universal LLT lamp when operating with the electronic ballast can never have any electric arc. The at least one thermal protection device used in front of the first electrical contact of the at least two electrical contacts in the shock prevention switch is configured to cut off electric current when a predetermined cut-off temperature is reached. The use of the at least one thermal protection device ensures that an electric arc, if existed, will not continue over several seconds between the socket copper contacts on the external linear tube lamp fixture and the bi-pin and between the at least two electrical contacts in the shock prevention switch.

When such shock prevention switches, no matter whether they have a single control or double controls, are used on both ends of the universal LLT lamp, the switches can effectively block an electric current flowing through the LED driving circuit to an exposed bi-pin not yet installed in the fixture sockets, no matter whether the current is from the AC mains or a ballast. In other words, with such shock prevention switches with the at least one thermal protection device on both ends of the universal LLT lamp, no line voltage or leakage current from the ballast will possibly appear at the exposed bi-pin, and almost no electrical arcing will possibly continue to burn the plastic enclosure in the universal LLT lamp for electronic ballast applications during initial installation or re-lamping, thus completely eliminating the electric shock and the fire hazards.

Because double shock prevention switches are used in both ends of the lamp, consumers can safely install such a universal LLT lamp in the existing lamp fixture used to operate a conventional fluorescent tube without operational uncertainty and electric shock and fire hazards, no matter how the fixture is wired as with double-ended AC mains or an electronic ballast. The universal LLT lamp can immediately be used with an existing electronic ballast in a fixture without rewiring. When the ballast dies, consumers may choose to replace it with a new one at cost or just to bypass it and to electrically connect the fixture as an AC mains-operable one. In the latter case, the consumers can just install the universal LLT lamp back into the fixture without worrying about possible electric shock hazard that may occur when they accidentally touch an exposed bi-pin on the other end of the lamp.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
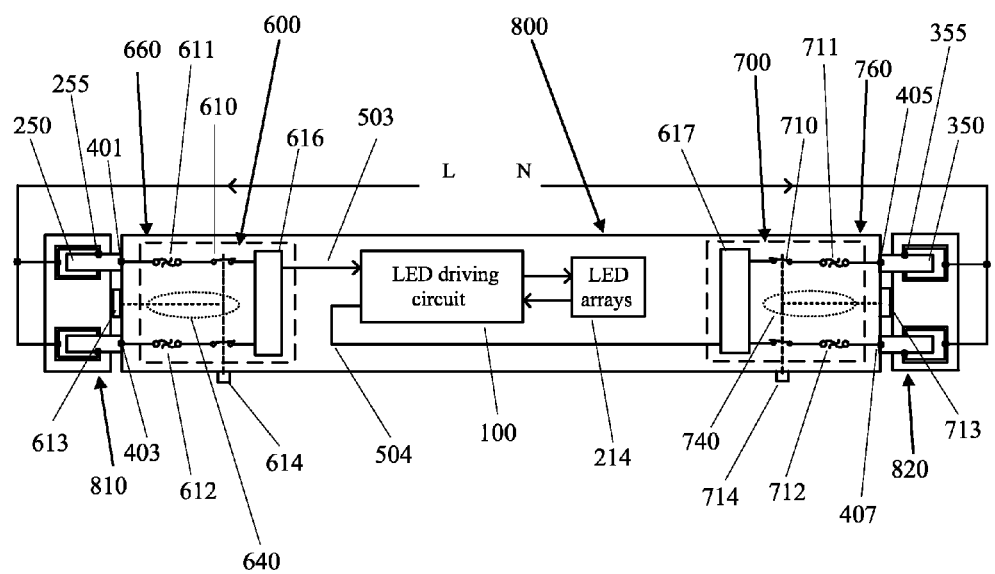
FIG. 1 is a block diagram of a universal LLT lamp installed in lamp fixture sockets connected with the AC mains according to the present disclosure.

FIG. 1 is a block diagram of a universal LLT lamp installed in lamp fixture sockets connected with the AC mains according to the present disclosure. The universal LLT lamp 800 comprises a housing having two ends; two lamp bases 660 and 760 having respective bi-pins 250 and 350 at each end of the housing; two input modules 600 and 700 respectively comprising shock prevention switches 610 and 710, thermal protection devices 611, 612, 711, and 712, and filament circuits 616 and 617; two actuation mechanisms 640 and 740 of the shock prevention switches 610 and 710 respectively in the two lamp bases 660 and 760; an LED driving circuit 100 having two input/outputs 503 and 504; and LED arrays 214 on an LED PCB. Each of the filament circuits 616 and 617, comprising at least a resistor, has three ports, in which the first and the second ports connect to the two pins of the respective bi-pins 250 and 350 through the shock prevention switches 610 and 710 and the thermal protection devices 611, 612, 711, and 712; and the third port connects to the input/output ports 503 and 504. The LED driving circuit 100 thus can receive power from the bi-pins 250 and 350 connected to the AC mains or the electronic ballast in a double-ended wiring lamp fixture to power the LED arrays 214. As can be seen in FIG. 1, the filament circuits 616 and 617 in the input modules 600 and 700 do not have effect in the double-ended AC mains operation because each of external fixture lamp sockets 810 and 820 are shunted. In fact, the filament circuits 616 and 617 are used to mimic filaments so that a rapid-start electronic ballast can be used with the universal LLT lamp. This will be depicted in FIG. 2.

In FIG. 1, the shock prevention switch 610 in the input module 600 at the lamp base 660 is of double-pole type, which comprises the actuation mechanism 640, at least one front control portion 613, a side control portion 614, and two sets of electrical contacts. In the first set of the electrical contacts, the first electrical contact connects to the thermal protection device 611, further connecting to the upper pin of the bi-pin 250 at an electrical contact 401, whereas the second electrical contact connects to the first port of the filament circuit 616. In the second set of the electrical contacts, the first electrical contact connects to the thermal protection device 612, further connecting to the lower pin of the bi-pin 250 at an electrical contact 403, whereas the second electrical contact connects to the second port of the first filament circuit 616. Both the at least one front control portion 613 and the side control portion 614 link to the actuation mechanism 640 in a way that the at least one front control portion 613 and the side control portion 614 must be activated in sequence before actuating the actuation mechanism 640 to turn on the switch contacts. Similarly, the shock prevention switch 710 in the input module 700 at the other lamp base 760 comprises the actuation mechanism 740, at least one front control portion 713, a side control portion 714, and two sets of electrical contacts. In the first set, the first electrical contact connects to the thermal protection device 711, further connecting to the upper pin of the bi-pin 350 at an electrical contact 405, whereas the second electrical contact connects to the first port of the filament circuit 617. In the second set, the first electrical contact connects to the thermal protection device 712, further connecting to the lower pin of the bi-pin 350 at an electrical contact 407, whereas the second electrical contact connects to the second port of the filament circuit 617. Both the at least one front control portion 713 and the side control portion 714 link to the actuation mechanism 740 in a way that the at least one front control portion 713 and the side control portion 714 must be activated in sequence before actuating the actuation mechanism 740 to turn on the switch contacts.

The at least one front control portions 613 and 713 on the two opposite ends of the universal LLT lamp 800, protruding outwards, are activated when the universal LLT lamp 800 is installed in fixture lamp sockets 810 and 820 where the at least one front control portions 613 and 713 are pressed in or twisted on. The side control portions 614 and 714 are manual controls. After the universal LLT lamp 800 is installed in the fixture lamp sockets 810 and 820 with the at least one front control portions 613 and 713 activated, an installer must manually activate the side control portions 614 and 714 to actuate the switch actuation mechanisms 640 and 740 to respectively turn on the switch contacts and power the universal LLT lamp 800.

Both shock prevention switches 610 and 710 have an on-state and an off-state, respectively referring to switch-on and switch-off conditions. Both shock prevention switches 610 and 710 are normally "off" when the universal LLT lamp 800 is not installed in a lamp fixture, in which the at least one front control portions 613 and 713 are protruded farthest out. In the off-state, the electrical contacts are disconnected, preventing any electrical arc from occurring. In the on-state, when the at least one front control portions 613 and 713 and the side control portions 614 and 714 are activated in sequence, the actuation mechanisms 640 and 740 are respectively actuated to turn on the connection between the AC mains or the electronic ballast and the LED driving circuit 100. The reason why the at least one front control portions 613 and 713 are needed is guaranteed electric shock prevention. If the at least one front control portions 613 and 713 are not present, a single use of the side control portions 614 and 714, which are manual controls, can easily be defeated resulting in a risk of the electric shock because the installer has no knowledge if the side control portions 614 and 714 are in "on" state or "off" state.

Figure 2:
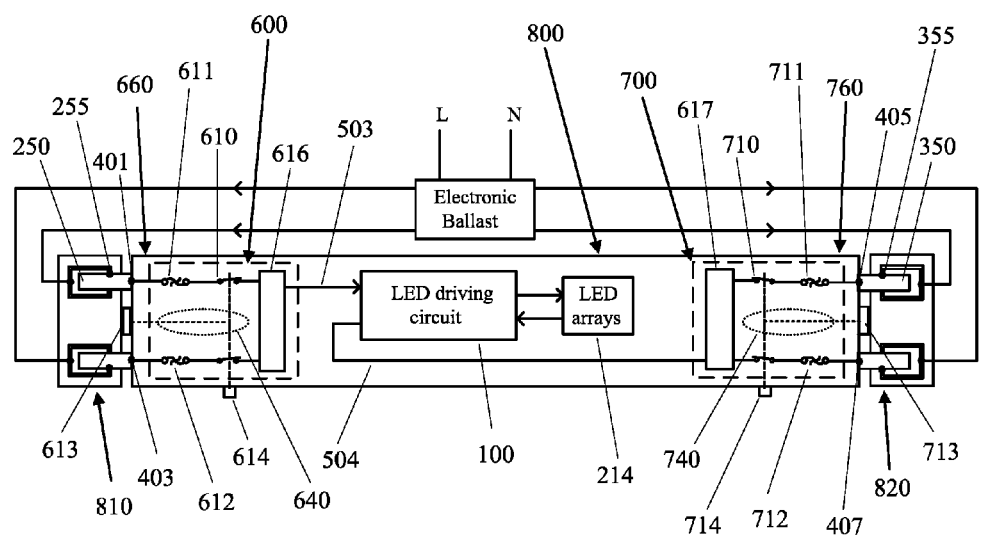
FIG. 2 is a block diagram of a universal LLT lamp installed in lamp fixture sockets connected with a rapid-start electronic ballast according to the present disclosure.

FIG. 2 is a block diagram of a universal LLT lamp installed in lamp fixture sockets connected with a rapid-start electronic ballast according to the present disclosure. FIG. 2 is almost the same as FIG. 1, except that the rapid-start electronic ballast rather than the AC mains is used to power the universal LLT lamp 800. The rapid-start electronic ballast has four output wires with two wires connected to the fixture lamp socket 810 and another two connected to the fixture lamp socket 820. In the universal LLT lamp 800, the two filament circuits 616 and 617 in the input modules 600 and 700 are configured to couple across the bi-pins 250 and 350, through the shock prevention switches 610 and 710 and thermal protection devices 611, 612, 711, and 712 to mimic the filaments in a fluorescent lamp to operate with a rapid-start electronic ballast. However, not like the filament in the fluorescent lamp in which a low resistance such as 10 ohms is used, each of the filament circuits 616 and 617 in the input modules 600 and 700 must have a low impedance such as less than hundreds of ohms at a high frequency such as 45 kHz or higher when operated with the rapid-start electronic ballast and a high impedance such as several kilo ohms at 50/60 Hz when operated with AC mains. The best choice is to make such high and low impedances in a way that an impedance ratio between the high impedance and the low impedance is higher than 13 at frequencies between 60 Hz and 45 kHz. Thus, the two filament circuits 616 and 617 in the input modules 600 and 700 can be used to selectively allow an alternating current (AC) current at the high frequency from the rapid-start electronic ballast to pass through but effectively block the AC current at the low frequency from the AC mains. Otherwise, when the AC mains are accidentally applied single-ended between respective two pins of the bi-pins 250 and 350, a large current passing through the filament circuits 616 and 617 in the input modules 600 and 700 can burn them out immediately, thereby causing a fire hazard.

In general, the installer will not turn off the power before installing or replacing the LLT lamp, although an installation instruction of the LLT lamp always instructs to turn off the power before installation. This is especially true in office area, where a lot of the LLT lamps are going to be replaced and when a manager considers that an office without a light dramatically affects productivity. After the installer installs the universal LLT lamp 800 in the fixture lamp sockets 810 and 820 wired as an electronic ballast compatible configuration with a power on, she or he needs to rotate the tube lamp 90 degrees to light it up because the copper contacts 255 and 355 in the fixture lamp sockets 810 and 820 (sockets copper contacts, hereafter) are not yet in contact with the bi-pins 250 and 350 of the universal LLT lamp 800 until the 90-degree rotation is made. In most cases, the universal LLT lamp lights up immediately and normally. In some cases, the universal LLT lamp lights up immediately but exhibits buzzing operation, a phenomenon of an electric arc occurring between the socket copper contacts 255 and 355 and the bi-pins 250 and 350. The electric arc has a non-linear relationship between current and voltage. Once the electric arc is established when any pin of the bi-pins 250 and 350 momentarily touch the socket copper contacts 255 and 355, then separate due to a worn pper contact, current results in a lower voltage between the arc terminals—a negative resistance Unfortunately, the electronic ballast provides an impedance to maintain a stable arc. This property is the reason why uncontrolled electric arcs in a conventional LED tube lamp become so destructive, since once initiated, the arcs will draw more and more current and power from the ballast, generating high heat until the lamp base of the conventional LED tube lamp is destroyed, creating a fire hazard. On the other hand. if the shock prevention switches 610 and 710 in the universal LLT lamp 800 comprise double controls embodied by the at least one front control portions 613 and 713 and the side control portions 614 and 714, and only after such two controls are executed in sequence, can the electric current flow into and out of the LED driving circuit 100, then the electric arc can barely occur, so can the electric shock. In other words, when the installer first installs the universal LLT lamp 800 and rotates the lamp 90 degrees, the shock prevention switches 610 and 710 are not yet actuated to turn on the electrical connection between the electrical contacts in the shock prevention switches 610 and 710 because only the first control is executed with the at least one front control portions 613 and 713 pressed in or twisted on, no current flow and thus no arcing possible, although the bi-pins 250 and 350 touch the socket copper contacts 255 and 355 and therefore are energized. At this time, the installer executes the second control by activating the side control portions 614 and 714 to actuate the switch actuation mechanisms 640 and 740 to turn on the shock prevention switches 610 and 710, thus connecting the LED driving circuit 100 with the external electrical power from the electronic ballast. This two-stage control removes almost all the possibility to have arcing occurred between the bi-pins 250 and 350 and the socket copper contacts 255 and 355. Nevertheless, there is still a tiny possibility that the electric arc may occur internally and externally. As a last resort, the thermal protection devices 611, 612, 711, and 712 are in place to shut off the electrical power, immediately terminating the electric arc. The thermal protection devices 611, 612, 711, and 712 need to be installed in proper locations, preferably in between each of the bi-pins 250 and 350 and the first electrical contact of the at least one set of the electrical contact in the shock prevention switches 610 and 710. In this location, the thermal protection devices 611, 612, 711, and 712 can prevent the electric arc from continuing, not only one between the lamp fixture sockets and the bi-pins but also one between the electrical contacts in the shock prevention switches 610 and 710.

Figure 3:
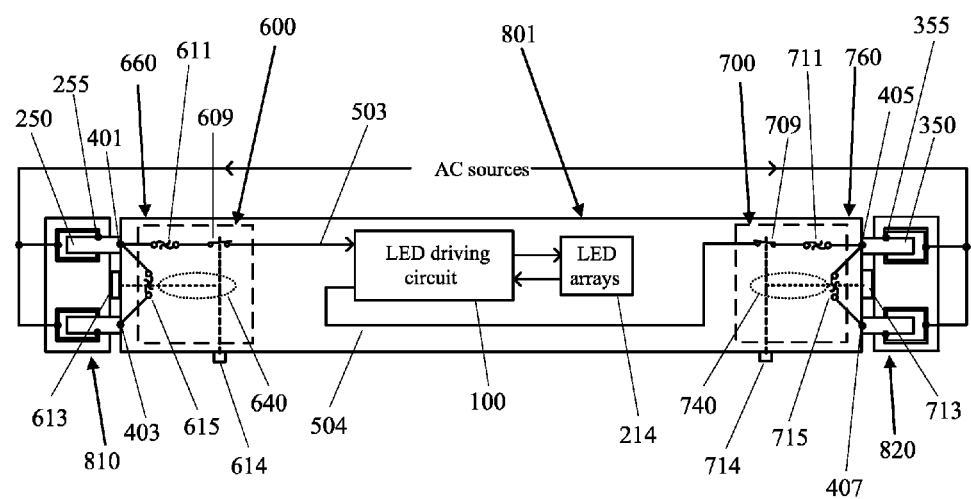
FIG. 3 is an embodiment of a universal LLT lamp installed in lamp fixture sockets connected with AC sources according to the present disclosure.

FIG. 3 is an embodiment of a universal LLT lamp installed in lamp fixture sockets connected with AC sources according to the present disclosure. In FIG. 3, the universal LLT lamp 801 is almost the same as in FIGS. 1 and 2, except that AC sources include an instant-start electronic ballast or the AC mains, that the shock prevention switches 609 and 709 are of single-pole, that thermal protection devices 615 and 715 are respectively installed between the two pins of the bi-pins 250 and 350, and that the input modules 600 and 700 comprise no filament circuits. Because no filament circuits exist, the universal LLT lamp 801 cannot operate with the rapid-start electronic ballast, and only one set of electrical contacts is needed in each of the shock prevention switches 609 and 709. To fully protect the universal LLT lamp 801 from fire hazards due to an electric arc occurring between the socket copper contacts 255 and 355 and the bi-pins 250 and 350, the two thermal protection devices 615 and 715 are respectively installed between the two pins of the bi-pins 250 and 350, in addition to the two thermal protection devices 611 and 711, respectively installed between one of two pins of the bi-pins 250 and 350 and the shock prevention switches 609 and 709. Similar to the shock prevention switches 610 and 710 depicted in FIGS. 1 and 2, the shock prevention switches 609 and 709 respectively comprise the switch actuation mechanisms 640 and 740, the at least one front control portions 613 and 713, and the side control portions 614 and 714. Only after two controls are executed in sequence, first the at least one front control portions 613 and 713 and then the side control portions 614 and 714, are the switch actuation mechanisms 640 and 740 actuated to turn on the shock prevention switches 609 and 709.

Figure 4:
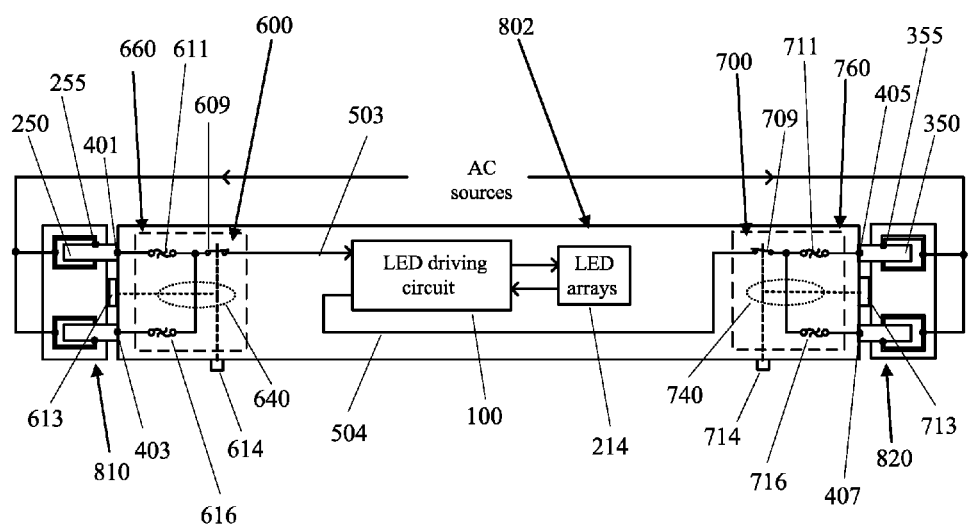
FIG. 4 is another embodiment of a universal LLT lamp installed in lamp fixture sockets connected with AC sources according to the present disclosure.

FIG. 4 is another embodiment of a universal LLT lamp installed in lamp fixture sockets connected with AC sources according to the present disclosure. In FIG. 4, the universal LLT lamp 802 is almost the same as in FIG. 3, except that the thermal protection devices 616 and 617 are respectively installed between one of the two pins of the bi-pins 250 and 350 and one of the electrical contacts in the respective shock prevention switches 609 and 709, in a way that the thermal protection devices 611 and 616 are connected each other before connecting to the shock prevention switch 609, and that the thermal protection devices 711 and 716 are connected each other before connecting to the shock prevention switch 709. The inclusion of the thermal protection devices 611, 616, 711 and 716 in this embodiment ensures that any electric arc occurred between the socket copper contacts 255 and 355 and the bi-pins 250 and 350 can be terminated in time, eliminating any fire hazards.

In FIGS. 3 and 4, the fixture lamp sockets 810 and 820 are electrically shunted; the thermal protection devices 615, 616, 715, and 716 may thus not be needed as long as the associated unused pins in the bi-pins 250 and 350 are electrically insulated. Although all the shock prevention switches 609, 610, 709, and 710 depicted in FIGS. 1-4 comprise two controls such as the at least one front control portions 613 and 713 and the side control portions 614 and 714 to effectively prevent an arc from occurring, the shock prevention switches 609, 610, 709, and 710 may comprise only one control without the side control portions 614 and 714, thus no arc prevention possible. The former shock prevention switch with double controls, therefore, may be termed as electric shock and arc prevention switch in the following claims to distinguish its difference from the latter one with only one control.

The shock prevention switches 610 and 710 may be of a contact type, wherein the shock prevention switches may be a snap switch, a push-button switch, a micro switch, a twist-on switch, or a rotary switch. The shock prevention switches 610 and 710 may be of a non-contact type, wherein the shock prevention switches may be electro-mechanical, electromagnetic, optical, electro-optic, fiber-optic, infrared, or wireless based. The shock prevention switches 610 and 710 may be of a sensing type having a proximity control with a sensing range up to approximately 8 mm.

Whereas preferred embodiments of the present disclosure have been shown and described, it will be realized that alterations, modifications, and improvements may be made thereto without departing from the scope of the following claims. Another kind of the shock prevention switches in an LED-based lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A linear light-emitting diode (LED) tube lamp, comprising:
   a housing having two ends;
   a light-emitting diode printed circuit board (LED PCB), the LED PCB comprising one or more LED arrays disposed thereon;
   two lamp bases each connected to a respective end of the two ends of the housing, each lamp base comprising a bi-pin each with two pins protruding outwards and configured to connect to an external fixture lamp socket, each lamp base further comprising an input module comprising a shock prevention switch and at least one thermal protection device electrically connected to the bi-pin; and
   an LED driving circuit configured to convert an input alternating current (AC) voltage from an external power supply into regulated direct current (DC) voltage and current provided to power the one or more LED arrays,
   wherein, for each lamp base, when either the respective shock prevention switch or the respective at least one thermal protection device is shut off, the input AC voltage is decoupled from the linear LED tube lamp, and
   wherein, for each lamp base, when the bi-pin is installed in the external fixture lamp socket, and when an electric arc starts between the bi-pin and the external fixture lamp socket and generates heat, the at least one thermal protection device is automatically shut off.

2. The linear LED tube lamp of claim 1, wherein the shock prevention switch of each of the lamp bases comprises:
   at least one set of electrical contacts comprising at least two electrical contacts, with one electrically connected to the at least one thermal protection device and another coupled to the LED driving circuit; and
   a switch actuation mechanism comprising at least one front control portion protruding outwards,
   wherein, when the at least one front control portion of the switch actuation mechanism is pressed in or twisted on as the bi-pin of the lamp base is installed in the external fixture lamp socket, the at least two electrical contacts of the at least one set of electrical contacts are electrically connected to actuate the shock prevention switch.

3. The linear LED tube lamp of claim 2, wherein the at least one thermal protection device is configured to cut off electric current to prevent the electric arc from continuing between the external fixture lamp socket and the bi-pin and between the at least two electrical contacts in the shock prevention switch.

4. The linear LED tube lamp of claim 1, wherein the shock prevention switch is of a double-pole type.

5. The linear LED tube lamp of claim 1, wherein the shock prevention switch is of a single-pole type.

6. The linear LED tube lamp of claim 1, wherein, for each lamp base, the input module further comprises a filament circuit connected between the shock prevention switch and the LED driving circuit.

7. The linear LED tube lamp of claim 1, wherein, for each lamp base, the at least one thermal protection device is further connected between the two pins of the bi-pin.

8. The linear LED tube lamp of claim 7, wherein the at least one thermal protection device is configured to cut off electric current to prevent the electric arc from continuing between the external lamp socket and the bi-pin.

9. The linear LED tube lamp of claim 1, wherein the shock prevention switches is of a contact type.

10. The linear LED tube lamp of claim 9, wherein the shock prevention switch comprises a snap switch, a push-button switch, a micro switch, a twist-on switch, or a rotary switch.

11. The linear LED tube lamp of claim 1, wherein the shock prevention switch is of a non-contact type.

12. The linear LED tube lamp of claim 11, wherein the shock prevention switch is electro-mechanical, electromagnetic, optical, electro-optic, fiber-optic, infrared, or wireless based.

13. The linear LED tube lamp of claim 11, wherein the shock prevention switch is of a sensing type comprising a proximity control.

14. The linear LED tube lamp of claim 13, wherein the proximity control of the shock prevention switch has a sensing range up to approximately 8 mm.

15. A linear light-emitting diode (LED) tube lamp, comprising:
   a housing having two ends;
   a light-emitting diode printed circuit board (LED PCB), the LED PCB comprising one or more LED arrays disposed thereon;
   two lamp bases each connected to a respective end of the two ends of the housing, each lamp base comprising a bi-pin each with two pins protruding outwards and configured to connect to an external fixture lamp socket, each lamp base further comprising an input module comprising an electric shock and arc prevention switch and at least one thermal protection device electrically connected to the bi-pin; and
   an LED driving circuit configured to convert an input alternating current (AC) voltage from an external power supply into regulated direct current (DC) voltage and current provided to power the one or more LED arrays,
   wherein, for each lamp base, when either the respective electric shock and arc prevention switch or the respective at least one thermal protection device is shut off, the input AC voltage is decoupled from the linear LED tube lamp, and
   wherein, for each lamp base, when the bi-pin is installed in the external fixture lamp socket and energized, the electric shock and arc prevention switch is not actuated to turn on the connection between the AC power and the LED driving circuit.

16. The linear LED tube lamp of claim 15, wherein the electric shock and arc prevention switch of each of the lamp bases comprises:
   at least one set of electrical contacts comprising at least two electrical contacts, with one electrically connected to the at least one thermal protection device and another coupled to the LED driving circuit;
   a switch actuation mechanism;
   at least one front control portion protruding outwards; and
   a side control portion,
   wherein, when the at least one front control portion is first pressed in or twisted on as the bi-pin of the lamp base is installed in the external fixture lamp socket and energized, and when the side control portion is activated, the at least two electrical contacts of the at least one set of electrical contacts are electrically connected to actuate the electric shock and arc prevention switch.

17. The linear LED tube lamp of claim 16, wherein the at least one thermal protection device is configured to cut off electric current to prevent an electric arc from continuing between the external fixture lamp socket and the bi-pin and between the at least two electrical contacts in the electric shock and arc prevention switch.

18. The linear LED tube lamp of claim 16, wherein, for each lamp base, the electric shock and arc prevention switch comprises a control mechanism comprising two controls in sequence.

19. The linear LED tube lamp of claim 15, wherein the electric shock and arc prevention switch is of a double-pole type.

20. The linear LED tube lamp of claim 15, wherein the electric shock and arc prevention switch is of a single-pole, type.

21. The linear LED tube lamp of claim 15, wherein the input module further comprises a filament circuit connected between the electric shock and arc prevention switch and the LED driving circuit.

22. The linear LED tube lamp of claim 15, wherein, for each lamp base, the at least one thermal protection device is further connected between the two pins of the bi-pin.

23. The linear LED tube lamp of claim 22, wherein the at least one thermal protection device is configured to cut off electric current to prevent the electric arc from continuing between the external fixture lamp socket and the bi-pin.

24. The linear LED tube lamp of claim 15, wherein the electric shock and arc prevention switches is of a contact type.

25. The linear LED tube lamp of claim 24, wherein the shock prevention switch comprises a snap switch, a push-button switch, a micro switch, a twist-on switch, or a rotary switch.

26. The linear LED tube lamp of claim 15, wherein the electric shock and arc prevention switch is of a non-contact type.

* * * * *